United States Patent [19]
Martin et al.

[11] Patent Number: 5,765,108
[45] Date of Patent: Jun. 9, 1998

[54] TELECOMMUNICATIONS SYSTEM

[75] Inventors: Andrew Louis Martin, Ferny Creek; Norman William McLeod, Glen Iris, both of Australia

[73] Assignee: Telstra Corporation Limited, Melbourne, Australia

[21] Appl. No.: 442,630

[22] Filed: May 17, 1995

Related U.S. Application Data

[63] Continuation of Ser. No. 962,236, PCT/AU92/00394 filed on Jul. 31, 1992, abandoned.

[30] Foreign Application Priority Data

Jul. 31, 1991 [AU] Australia ............... PK 7508/91

[51] Int. Cl.$^6$ ....................... H04Q 7/22
[52] U.S. Cl. ............ 455/422; 455/565; 455/414
[58] Field of Search ............... 379/58, 59, 62, 379/63, 198, 200, 234; 455/410, 411, 419, 422, 509, 550, 565, 414; 380/21, 23

[56] References Cited

U.S. PATENT DOCUMENTS

| | | | |
|---|---|---|---|
| 4,096,356 | 6/1978 | Burtness et al. | 379/198 |
| 4,680,786 | 7/1987 | Baker et al. | 379/60 |
| 4,691,346 | 9/1987 | Vanacore | 379/198 |
| 5,025,254 | 6/1991 | Hess . | |
| 5,040,177 | 8/1991 | Martin et al. . | |
| 5,251,248 | 10/1993 | Tokunaga et al. | 379/58 |
| 5,274,698 | 12/1993 | Jang | 379/198 |
| 5,303,285 | 4/1994 | Kerihuel et al. | 379/58 |
| 5,588,042 | 12/1996 | Comer | 379/59 |

FOREIGN PATENT DOCUMENTS

| | | |
|---|---|---|
| 11503/88 | 1/1988 | Australia . |
| 180178 | 5/1986 | European Pat. Off. . |
| 2-262795 | 10/1990 | Japan . |
| 1387437 | 3/1975 | United Kingdom . |
| WO 91 07838 | 5/1991 | WIPO . |

OTHER PUBLICATIONS

"Straw Man for Automatic Roaming" EIA Working Group II, pp. 1–24, Jun. 1985.

Primary Examiner—Dwayne Bost
Assistant Examiner—William G. Trost
Attorney, Agent, or Firm—Thomas J. Engellenner; Anthony A. Laurentano; Lahive & Cockfield, LLP

[57] ABSTRACT

A telecommunication system having a cellular mobile telephone system in which calls from cellular telephones are routed through a mobile service switching center exchange. Users of the system, having control of respective groups of mobile telephone are able via user terminals to access respective databases in a signalling processor and to place in the data base information about call parameters, such as call restrictions, for ones of the telephone of that user controlled group. When a call is made from any mobile telephone, the call signal is decoded at the relevant exchange and a determination is made as to whether the call originates from a mobile telephone which is a member of a controlled group. If so, the related database in the controller is accessed and the call is controlled in accordance with the appropriate call parameter, on the basis of the information in the related database.

22 Claims, 8 Drawing Sheets

Microfiche Appendix Included
(18 Microfiche, 4615 Pages)

TELECOMMUNICATIONS SYSTEM

This application is a continuation of application Ser. No. 07/962,236, filed as PCT/AU92/00394 filed on Jul. 31, 1992, abandoned, Entitled: A TELECOMMUNICATIONS SYSTEM. The contents of all of the aforementioned applications are expressly incorporated by reference.

A computer program listing useful in connection with the present invention has been deposited with U.S. Patent and Trademark Office as a microfiche appendix. This appendix consists of 4615 frames of program listing on eighteen microfiche.

The present invention relates to a telecommunications system.

For companies which provide a number of their employees with cellular mobile telephones for business use, it is often desirable that the company or a company administrator be able to maintain a degree of control over the usage of the mobile telephones. In particular, since telephone calls originated from mobile telephones are usually timed calls which are charged at a certain rate per minute, it may be particularly advantageous, for example, for the company administrator to have some control over the duration and total time of telephone calls initiated from the company's mobile telephones. It may also be advantageous, for example, that the making of outgoing telephone calls from the company's mobile telephones be possible only during week days, or business hours. By allowing control, by a company, over various parameters of outgoing calls from the company's mobile telephones, it is possible for the company to maintain a large degree of control over the costs incurred by the use of the mobile phones.

In accordance with the present invention there is provided a method of controlling telecommunications initiated from a radio telephone wherein upon initiation of telecommunications said radio telephone transmits first data which is indicative of a characteristic unique to said radio telephone, the method comprising:

receiving said first data and determining membership of said radio telephone to a controlled group on the basis of a stored relationship between said first data and said controlled group;

accessing stored control data corresponding to said first data, said control data including indications of allowed and disallowed call characteristics for telecommunications initiated from the radio telephone; and controlling said telecommunications in accordance with said control data.

Preferably said first data comprises the telephone number of the radio telephone.

Preferably, the step of determining membership of said radio telephone to said controlled group comprises allocating a classification label corresponding to said first data in a stored database and comparing said allocated classification label with a predetermined classification label to determine membership to said controlled group.

Preferably too, the step of determining membership of said radio telephone to said controlled group takes place at the originating radio telephone exchange.

The method may include the step of routing signalling data relating to said telecommunications initiated by said radio telephone to a call processor where said steps of accessing stored control data and controlling the telecommunications are performed.

The present invention also provides an apparatus for use with a telecommunications system including a radio telephone which, upon a call being initiated from said radio telephone, transmits first data which is indicative of a characteristic unique to said radio telephone, and at least one exchange which receives said first data transmitted from the radio telephone, the apparatus comprising means for determining membership of said radio telephone to a controlled group on the basis of the received first data and forwarding signalling data to a call processing means if said radio telephone is a member of the controlled group, the call processing means including:

stored control data corresponding to members of said controlled group;

accessing means for accessing the control data corresponding to said radio telephone on the basis of the received signalling data; and control means to control at least one characteristic of the call in accordance with said control data.

The invention also provides a telecommunications system comprising:

a radio telephone which, upon a call being initiated from the radio telephone, transmits first data which is indicative of a characteristic unique to said radio telephone;

at least one exchange which receives said first data transmitted from the radio telephone and generates signalling data for the call;

a call processing means which receives the signalling data and controls the cal on the basis of stored control data corresponding to the radio telephone.

Call characteristics which may be controlled in accordance with the present invention include:

the call type, for example, whether or not calls may be placed from the radio telephone to PABX, local, STD, IDD and operator destinations;

the duration of individual telephone calls;

the time elapsed after completion of one call before another call may be initiated;

the cumulative duration of telephone calls originating from the radio telephone made over a selected time interval, such as the cumulative duration per month;

the time of day and days of the week during which PABX, local, STD and IDD calls may be made; and the call destination, which may be restricted to certain numbers or number ranges.

The present invention is further described hereinafter, by way of example only, with reference to the accompanying drawings throughout which like reference numerals refer to equivalent features, wherein.

Figure 1:
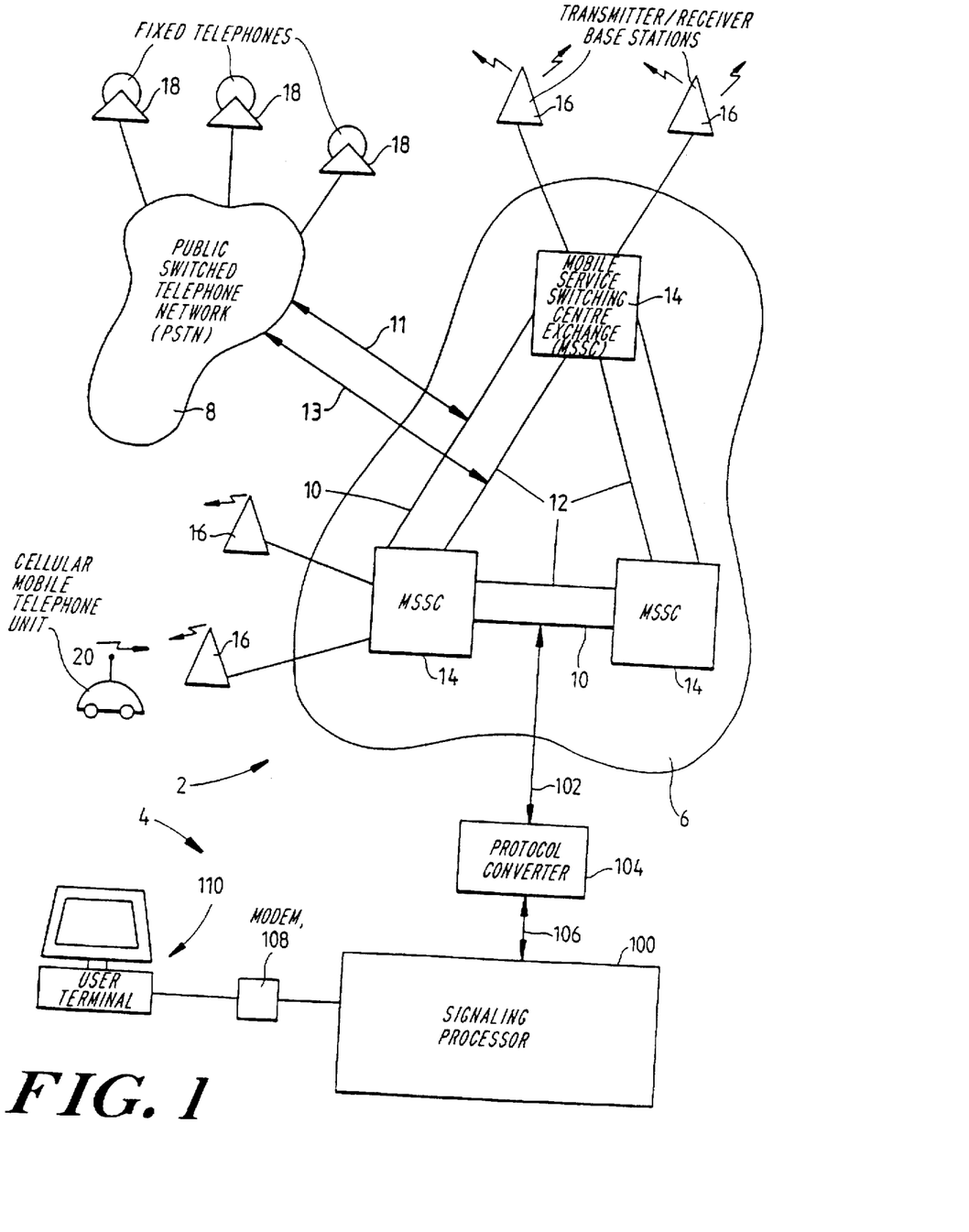
FIG. 1 is a diagrammatic representation of a telecommunications system incorporating the present invention.

In FIG. 1 there is shown a telecommunications system 2, which includes a cellular mobile telephone system (CMTS) 6 and a public switched telephone network (PSTN) 8. The public switched telephone network 8 is an extensive network comprising a plurality of interconnected switching exchanges which provide interconnections between fixed telephones 18, public telephones, PABX's, etc. The cellular mobile telephone system 6 comprises a plurality of mobile service switching centre exchanges (MSSC) 14, each of which may control a plurality of transmitter/receiver base stations 16. Each base station 16 services a single cell in the cellular network. The mobile service switching centre exchanges 14 are interconnected to form the cellular mobile telephone system network 6 by means of two communication paths: a voice communication path 12, and a signalling communication path 10. The signalling and voice communication paths 10, 12 of the cellular mobile telephone system 6, also interconnect to the public switched telephone network 8 by way of communication links 11, 13 respectively, which allows signalling and data communication between the exchanges of the networks 6 and 8, and subsequently allows communication between cellular mobile telephones 20 connected to the cellular mobile telephone system 6 and fixed telephones, PABX's, etc., connected to the public switched telephone network 8.

The voice communication path (voice channel) 12 carries data such as voice data or, for example, data from a facsimile machine between exchanges, and it is ordinarily implemented by way of a time and/or frequency multiplexed multi-channel pulse coded modulation system, or the like, such as a pulse code modulation thirty channel system (PCM30). The signalling communication path 10 conveys signalling information which may relate to a particular voice channel on the voice communication path 12, the signalling information being in a Comite Consultatif International Telegraphique (CCIT) Common Channel Signalling System No. 7 (CCS7) protocol form, and may also be transmitted by way of a multiple channel multiplexed modulated system. In accordance with the Common Channel Signalling No. 7 protocol, signalling information is formed into CCS7 packets or messages for transmission between exchanges, wherein a single CCS7 packet may convey the signalling information relating to a particular telephone call.

The preferred embodiment of the present invention includes a cellular controller indicated in FIG. 1 by reference numeral 4. The cellular controller apparatus 4 includes a signalling processor 100 which is coupled to the signalling communication path 10 of the cellular mobile telephone system 6 by way of a protocol converter 104. The protocol converter 104 is interposed between the cellular network 6 and the signalling processing 100, being coupled to the signalling communication path 10 by means of a CCS7 protocol signalling data link 102, and coupled to the signalling processor 100 by means of an RS232 protocol data link 106. The signalling processor 100 may also be coupled to a plurality of user terminals 110 through modems 108.

The following description relates specifically to an implementation of the preferred embodiment of the present invention for use with LM Ericsson AXE exchanges using CCITT Common Channel Signalling System No. 7 protocol to communicate between the cellular controller 4 and the cellular network 6. The use of the word "customer" in this description refers to an organisation that has bought or leased the cellular controlling facility, and the "group administrator" is a member of the organisation who is responsible for the cellular controlling facility for that organisation. Furthermore, unless the contrary is clearly intended, reference in the following description to a telephone call means a telephone call initiated from a cellular mobile telephone, wherein:

the A-party number is the identifying telephone number of the cellular telephone of the party who initiates the telephone call, the A-party; and the B-party number is the identifying telephone number of the terminal to which the telephone call initiated by the A-party is directed.

Outlined below is a simplified sequence of events which ordinarily occurs when a telephone call is initiated from a cellular mobile telephone (with reference to FIG. 1):

a. The B-party telephone number is dialled by the A-party from the A-party cellular mobile telephone unit 20;

b. The A-party cellular telephone radio signal is received by cellular base stations 16 in the vicinity of the A-party cellular telephone 20;

c. The base station 16 with the strongest reception signal level receives the call signalling information from the A-party cellular telephone 20, transfers the signalling information to the mobile service switching centre exchange 14 to which it is coupled, hereinafter referred to as the originating mobile switching centre or OMSC, and allocates a voice channel on a voice data link to the OMSC;

d. The B-party telephone number dialled by the A-party is analysed by processing means in the OMSC to determine an outgoing route of interconnected exchanges to be employed to reach the required telephone number (the B-party destination); and e. Following the above analysis, an outgoing route is selected by the OMSC according to number analysis tables and the call is directed via this route towards its destination, a voice channel on the voice communication path 12, 13 being allocated along the selected route for transfer of voice data, whilst signalling data is transmitted over the signalling communication path 10, 11 along the same route as the voice data, or an equivalent route.

In conveying signalling information, each CCS7 packet or message includes a message address label known as a routing label, containing information about where the message originated from, where it is directed to, and the identifying number of the speech circuit to which it is associated in the originating exchange. The routing label comprises:

Destination point code (DPC);

Originating point code (OPC); and

Circuit identification code.

There are several different varieties of CCS7 messages, including:

a. Initial address messages which are sent when the caller (A-party) first dials. They contain the A-party's number (sometimes referred to as the calling line identity), the B-party number and other information about the type of call being made.

b. Messages that the B-party has received all of the information it needs from the A-party.

c. Messages that the B-party has answered the telephone call.

d. Messages that the B-party is unable to answer because it is busy or that various forms of congestion have occurred somewhere in the telephone network in the path between the A-party and the B-party.

e. Messages relating to the charging for the calls.

f. Messages that indicate that the call has ended because one of the parties has hung up.

In particular, on initiation of a telephone call, an initial address message is sent which includes:

The A-party identifying telephone number;

The B-party identifying telephone number;

A calling party category (CPC) code; and

Information relating to charging for the telephone call.

Figure 2:
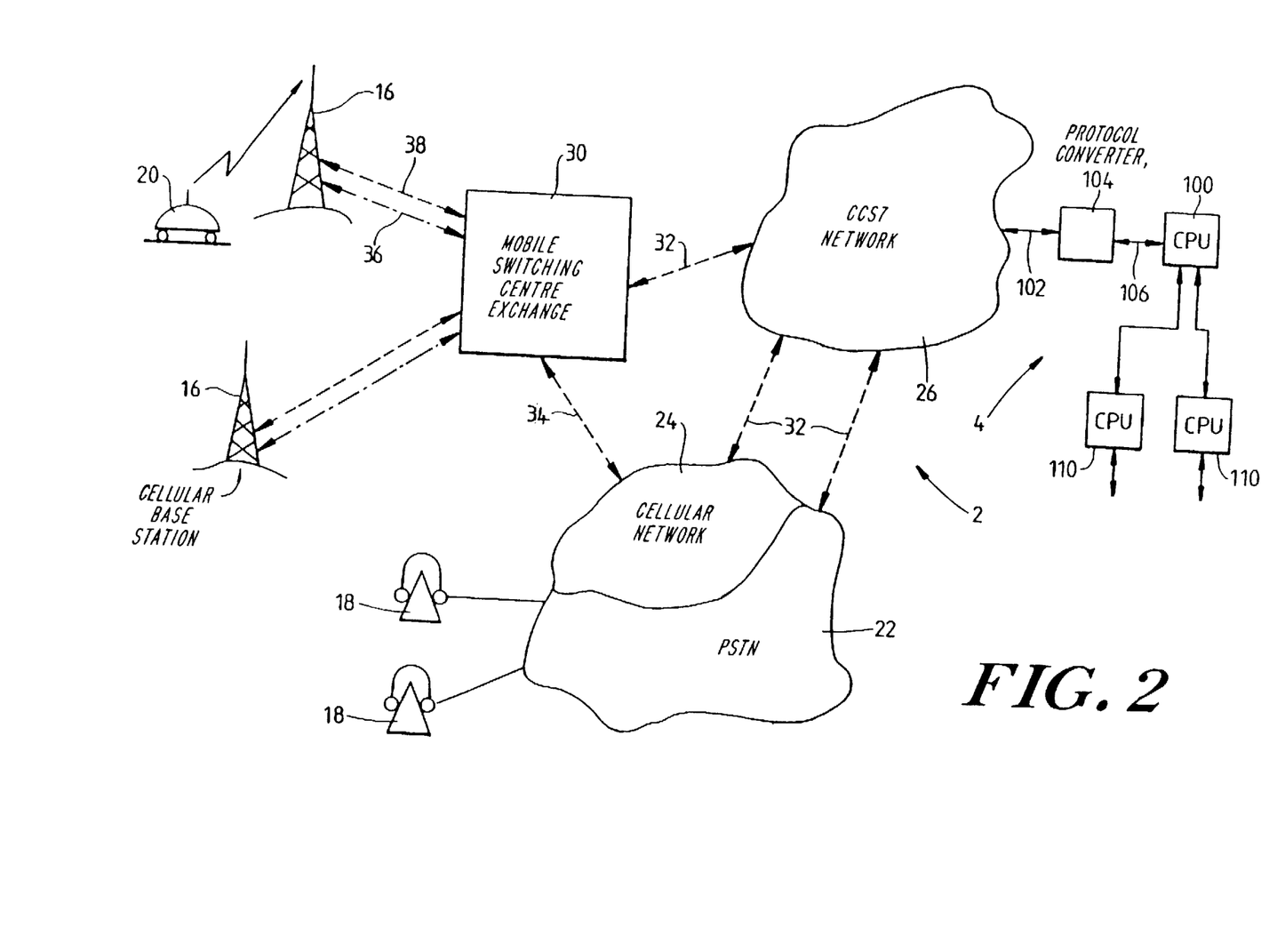
FIG. 2 is a generalised diagrammatic representation of the telecommunications system of FIG. 1, showing an originating mobile switching centre (OMSC)

FIG. 2 shows the telecommunications system 2 and cellular controller 4 of FIG. 1, represented in a form which is convenient for considering the operation of the preferred embodiment of the present invention. In this Figure, the originating mobile switching centre exchange 30 is shown separately from the remainder of the cellular network 24.

Even though the signalling data and voice data which is transferred between exchanges may in fact be carried on the same physical communication lines (wires, optical fibres, etc.), since the two varieties of data are quite separate, and are handled by separate circuitry, it is often convenient to consider the CCS7 signalling data as being carried by a CCS7 network 26, which is separate from the cellular mobile telephone system network 24 and public switched telephone network 22. As is represented in FIG. 2, the originating mobile switching centre exchange 30 is coupled to a plurality of cellular base stations 16 by voice and signalling data links 36, 38, and interconnected to the cellular network 24 by a voice communication path 34, and to the CCS7 network 26 by a signalling communication path 32. In this Figure, the broken flow-lines represent signalling transmission paths and the phantom flow-lines represent speech transmission paths. The CCS7 network 26 can be considered as carrying all of the signalling information packets or messages between the OMSC exchange 30, the MSSC exchanges incorporated in the cellular network 24, and the exchanges incorporated in the public switched telephone network 22. The cellular controller 4 is also coupled to the CCS7 network 26, the protocol converter 104 being connected to the network 26 by way of a data link 102, and the signalling processor 100 connected to the protocol converter 104 by way of data link 106. As in FIG. 1, a plurality of user terminals 110 may couple to the signalling processor 100 by way of modems (not shown).

Figure 3:
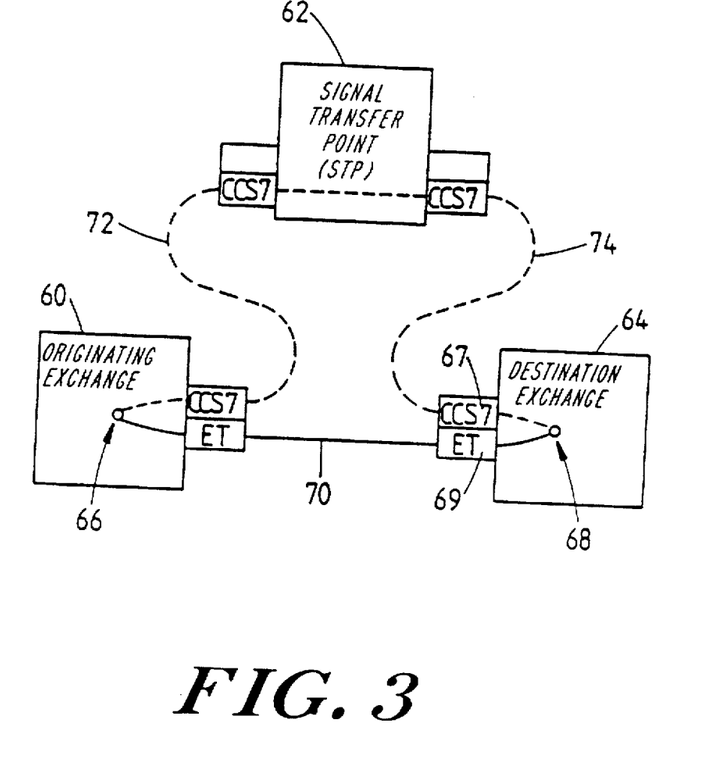
FIG. 3 illustrates signalling and voice data paths between exchanges of a telecommunications system.

The representation of the telecommunication system 2 shown in FIG. 2 is consistent with the flexibility with which signalling and voice data communications between exchanges may take place. The signalling data relating to a telephone call may or may not be transmitted between exchanges on the CCS7 signalling network 26 via the same physical route as the voice channel for that telephone call. As mentioned above, the signalling data may be transmitted from the originating exchange to the destination exchange via the same route as the voice data, or via an equivalent route. FIG. 3 shows the way in which the signalling data relating to a telephone call at an originating exchange 60 may be transmitted to a destination exchange 64 via a different route from the voice data, known as quasi-associated signalling, in accordance with the CCS7 protocol. Signalling data from a telephone call associated with originating speech circuits 66 in the originating exchange 60 may be sent by way of a signalling path 72 to an exchange 62 known as a signal transfer point (STP). The signalling data relating to the telephone call at the originating exchange 60 is then transferred from the signal transfer point exchange 62 to the destination exchange 64, by way of a signalling path 74, where it is associated with destination speech circuits 68. Meanwhile, the voice data of the telephone call from the originating speech circuit 66 is transmitted directly from the originating exchange 60 to the destination exchange 64 by way of a voice data path 70. At the destination exchange 64, the voice data input to the destination exchange 64 from the voice data path 70 by way of an exchange terminal 69 is again associated with the signalling data input to the exchange by way of CCS7 coupling 67, at the destination speech circuits 68. In this way, the voice data and the related signalling information will reach the same destination exchange, but the signalling information may have been carried on a different route and via an intermediate signalling transfer point (STP) to reach the destination exchange.

Figure 4:
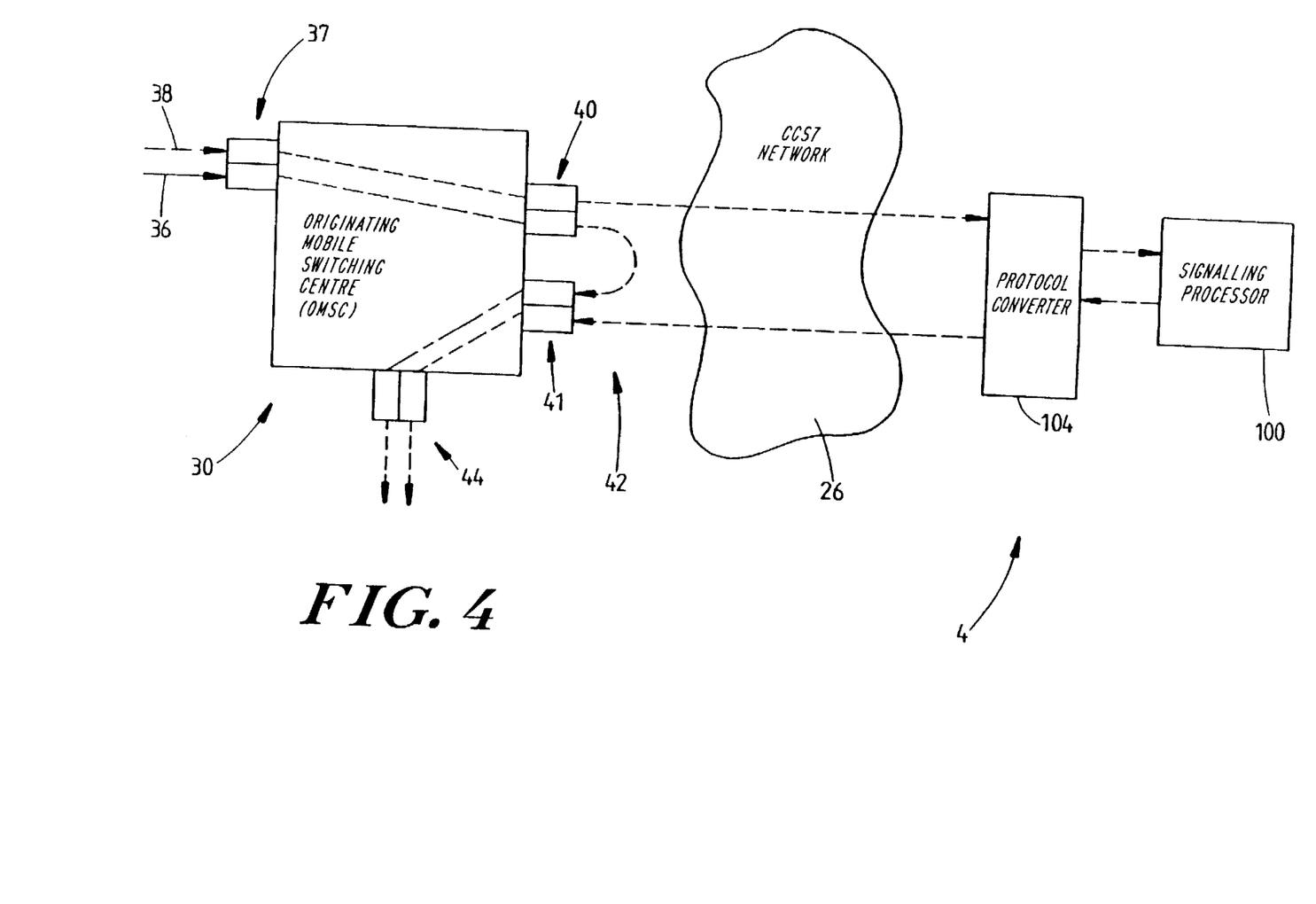
FIG. 4 shows signal paths associated with the originating mobile switching centre shown in FIG. 2.

In FIG. 4 there is shown the particular voice data and signalling data paths which are utilised by the preferred embodiment. In this Figure, also, the broken flow-lines represent transmission paths of signalling data, whilst the phantom flow-lines represent transmission paths of voice data. Voice and signalling data are input to the originating mobile switching centre exchange 30 by way of the line interface circuits 37, from the voice and signalling data links 36, 38, which may originate, for example, at a cellular base station 16 (see FIG. 2). As described above, during ordinary operation of the OMSC exchange 30, the signalling data input at the line interface circuits 37 is analysed at the exchange 30 to enable routing of the signalling and voice data to the appropriate destination exchange. However, in accordance with the preferred embodiment, under certain circumstances described in detail hereinafter, the signalling and voice data input at the line interface circuits 37 are directed along transmission paths illustrated in this drawing. In this case, the voice data is directed in the exchange 30 to an outgoing loop-back exchange terminal 40, whilst the signalling data associated therewith is directed via the CCS7 network 26 to the cellular controller 4. At the cellular controller 4, the signalling data is received by the protocol converter 104, whereupon the signalling data is converted from the telecommunications standard CCS7 protocol to an RS232 data protocol which is compatible with the signalling processor 100. The converted data is then sent to the signalling processor 100, which analyses and/or modifies the signalling data in a manner also described in detail hereinafter. The modified signalling data is then sent from the signalling processor 100 back to the protocol converter 104, for reconversion from the RS232 protocol to CCS7 format for transmission over the CCS7 network 26 back to the OMSC exchange 30.

At the OMSC exchange 30, the voice channel is directed from the outgoing loop-back exchange terminal 40 to an incoming loop-back exchange terminal 41, by virtue of the structure of the loop-back exchange termination 42, without leaving the vicinity of the OMSC exchange 30. The voice channel is held at the incoming loop-back exchange terminal 41 in the same manner as an incoming voice channel from another exchange, whilst the signalling data is processed by the signalling processor 100 and returned to the exchange 30 by way of the CCS7 network 26 to enable routing of the voice channel to an appropriate destination. When the processed signalling data is received at the OMSC exchange 30, the signalling data is again analysed within the exchange in the same way as an ordinary incoming call, and the voice channel is directed to the destination provided by the signalling data.

The circumstances warranting special treatment of the voice channel routing, referred to above, are analysed and determined at the time processing and analysis of the incoming signalling data first takes place within OMSC exchange 30. At the time of placing a telephone call, processing means within the OMSC exchange 30 is operative to analyse the CCS7 initial address message to determine, for example, the B-party telephone number, to enable the OMSC exchange to direct the voice and signalling channels to the requisite destination exchange which services the B-party telephone line. This analysis of the initial address message includes the determination of the calling party category (CPC) code. The calling party category code is designated by a traffic classification label (TCL), which labels range from TCL0 to TCL15. The value of the traffic classification label is indicative of the A-party terminal type or status, and different TCL numbers are allocated, for example, to terminal varieties such as public telephones, operator telephones, PABX terminals, etc. For the present purposes, the traffic classification label corresponding to an ordinary cellular mobile telephone is TCL3. The cellular mobile telephones corresponding to customers of the cellular controlling facility are allocated a traffic classification label of TCL15.

With reference to FIG. 2, when a telephone call is initiated by a cellular mobile telephone 20, a call signal is transmitted which includes both the A-party and B-party telephone numbers, or identification information equivalent thereto. The call signal is received by the transmitter/receiver base station 16 which relays the signal to the OMSC exchange 30 by way of the signalling data link 38. At the OMSC exchange 30, the call signal is decoded and the A-party number or identification code is isolated and referenced to a look-up table which contains a calling party category (CPC) code for each cellular mobile telephone number which is registered on the telecommunications system 2. If the entry in the look-up table for the A-party number contains a calling party category code of TCL3, indicating a standard cellular mobile telephone, the call is allowed to proceed normally. If, on the other hand, the look-up table indicates a calling party category code of TCL15 corresponding to the A-party telephone number, then the OMSC exchange processing means recognises this as indicating that the owner of the A-party cellular telephone is a customer of the cellular controlling facility, and subject to different treatment than ordinary cellular mobile telephones at the exchange 30.

Having identified the TCL15 status of the calling (A-party) number, the OMSC then assembles and transmits a CCS7 initial address message packet on the CCS7 network 26, having a message address label which contains a destination point code corresponding to the signalling processor 100.

The destination point code of the CCS7 packet is recognised by the cellular controller 4 as being directed to the signalling processor 100, and the information contained in the initial address message packet is converted from the CCS7 protocol to a protocol suitable for communication with the signalling processor (i.e. RS232). In the description of the cellular controller set forth hereinafter, it will be assumed that all signals transferred between the CCS7 network 26 and the signalling processor 100 are converted to the appropriate signal protocol for their destination.

The signalling processor 100, in the present implementation, comprises a single central processing unit (CPU) which may, for example, comprise a unix based minicomputer. The signalling processing 100 may alternatively comprise a plurality of central processing units, operating essentially in parallel, and accessing the same or duplicated databases, if greater processing power is required.

Each customer subscribing to the cellular controlling facility owns or is responsible for a number of cellular mobile telephones 20. Each customer is allocated a database in the signalling processor 100 to store information relating to constraints placed on the cellular mobile telephones under the control of the subscribing customer. Each customer's database contains constraints and limitations to be placed on each individual cellular mobile telephone under the control of the customer. In short, when a telephone call is placed from a cellular telephone belonging to a particular customer, the computer processor of the signalling processor 100 accesses the database file relating to that particular cellular telephone, and issues signals to the telecommunications system 2 to effect the constraints, privileges and limitations set by the customer for that cellular mobile telephone.

Each customer is afforded access to their own database on the signalling processor 100 by way of a user terminal 110 (for example, an IBM PC compatible computer terminal) which is connectable to input/output ports of the signalling processor 100 via a dial-up modem 108. When the customer establishes contact to the CPU of the signalling processor 100 using the modem 108, the signalling processor 100 may automatically down load the latest revision of software to be run on the user terminal 110 to enable access to the database of the respective subscribing customer. The software run on the user terminal 100 is primarily user-interface input/output software, which provides the customer with two options: to amend the database which contains the information relating to constraints and privileges placed on the cellular phones which are under the control of the subscribing customer, or to view data which has been collected by the signalling processor computer relating to the actual use of the cellular phones. To ensure security and integrity of the information in the databases, a password or PIN number type identification system may be utilised, together with a system whereby the signalling processor 100 calls back to a specified modem telephone number for the user terminal 110. The security system should ideally prevent unauthorised access to the signalling processor 100, and ensure that no customer can access another customer's databases.

The following is a summary of the types of constraints or privileges which may be set by the subscribing customer, and which are stored in the databases of the signalling processor 100, for each of the cellular mobile telephones under the control of the respective customer.

CALL TYPES

Calls to PABX's, Local, Subscriber Trunk Dialling (STD), International Direct Dialling (IDD) and operator destinations from subscribing cellular telephones are all subject to the constraints listed below. Each type of call may be allowed or barred as required, and constraints may be placed on each call type individually if required. Local calls are considered in relation to the originating mobile switching centre (OMSC).

CALL LIMITS

The call limits listed below apply to the various call types as indicated.

DURATION—The duration of PABX and local calls can be set to, for example, 1, 2, 3, 4 or unlimited minutes duration. When the set duration of a telephone call expires, the call is automatically disconnected by the cellular controller.

RETRY TIME—The time elapsed after completion of one call before another call can be initiated is settable to, for example, 0, 1, 2, 3, 4 minutes. This facility is a means available to the customer to prevent overriding of the effect of the fixed duration calls.

TOTAL AIR TIME (Minutes)—The total air time per month is settable by the customer and works in conjunction with the duration and retry time facilities to control the accrued costs of calls. The total air time may be settable from 0 to 1000 minutes per month (16.6 hours per month). The cellular controller system controls the number of calls and/or call duration and derives a total that prevents further calls from the particular cellular telephone if the cumulative time limit is exceeded.

TIME OF DAY/DAYS OF WEEK—The time of day parameter is used to control the time during a day when PABX and local calls can be made. It may also be applied to STD and IDD calls if necessary. The days of the week during which access is permitted is also settable if required. For example, local and PABX calls may be constrained so they may only be placed during business hours on weekdays.

MOBILE ON/OFF—The ability to place outgoing calls from any one or all of the mobile phones in a customer's group can be turned on or off by way of the cellular controller, as required. This facility may be used during holiday periods for example to stop all mobile originated calls. Emergency (000) calls and calls to other special services including calls to the group administrator may still be allowed from any location and not subject to any controls, while inward calls can always be received independent of the privileges assigned at the cellular controller 4.

CALL DESTINATIONS

The cellular controller operates by comprehensively analysing all the signalling information sent from the OMSC. Thus, by analysing the called (B-party) number the destination of a call can be controlled.

CUSTOMER OPERATORS—Calls to customer operators can be directed to the most appropriate operator, and may be optionally redirected to an appropriate regional operator depending on the time of day to take account such things as time zone differences.

CUSTOMER EMERGENCY—The customer's emergency telephone numbers may be set with alternative numbers to allow a call to be placed thereto from the controller cellular telephones without restrictions.

CUSTOMER GROUP ADMINISTRATOR—Calls may be made to the customer user group administrator at any time and without restriction. This allows, for example, a cellular telephone user who has exceeded his time limit for the month to apply to the group administrator for an extension of privileges.

DESTINATION RESTRICTION—All calls can be subject to destination restrictions so that PABX numbers may be restricted in range, local calls restricted to certain numbers and STD and IDD calls restricted to certain numbers or number ranges.

DIVERT-ON-BUSY—The divert-on-busy facility enables a call to be redirected if the first number called is busy.

SERVICE AREA COVERAGE LIMITS

Coverage limits for customer user group cellular telephones may be used to restrict the originating location or destination of a call. The effect of this facility is, for example, to restrict the mobile user to certain STD code areas and/or to restrict the area from which calls can be made.

Parameters for each of the above-mentioned customer controlled aspects are entered at the user terminal 110 for each cellular mobile telephone under the control of the particular customer, and are stored in that customer's database in the signalling processor 100.

The control over the cellular telephone originated calls is made via the signalling CCS7 network 26, and is enabled by the routing of signalling information from the originating mobile switching centre exchange 30 through the cellular controller 4 and signalling processor 100, beginning with the above-mentioned initial address message.

Figure 5:
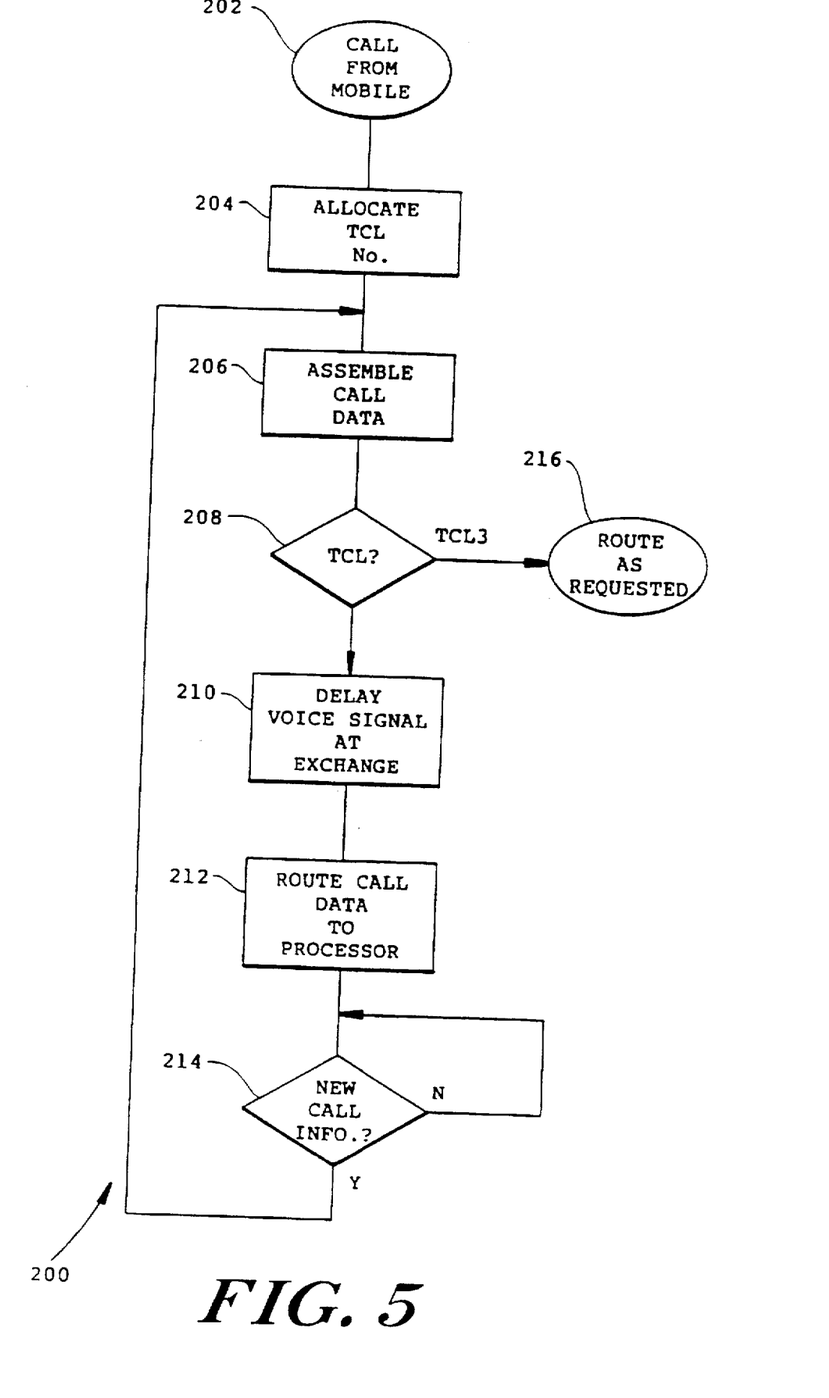
FIG. 5 is a flow-chart of events at the originating mobile switching centre.

FIG. 5 shows a flow-chart of the sequence of events which occurs at the originating mobile switching centre exchange 30 (OMSC) on initiation of a telephone call from a cellular mobile telephone 20. At step 202 a telephone call is initiated from a cellular mobile telephone 20, which transmits signalling information to a base station 16, and thence to the originating mobile switching centre exchange 30. The signalling information transmitted from the mobile telephone 20 includes the mobile telephone's own telephone number (the A-party number) as well as the telephone number dialled from the mobile telephone (the B-party number). The calling party category (CPC) label is derived from the A-party number at the OMSC exchange by reference to a look-up table which contains a list of all registered cellular mobile telephone numbers and their corresponding calling party category traffic classification label (TCL). For ordinary cellular mobile telephones a calling party category code of TCL3 is allocated at step 204, and for a cellular mobile telephone belonging to a subscribing customer of the cellular controlling facility a calling party category code of TCL15 is allocated. At step 206, the call signalling data for the telephone call is assembled into a CCS7 initial address message packet for transmission over the CCS7 signalling network 26. If the calling party category allocated at step 204 corresponds to a TCL3 code, then at step 208 the destination point code of the routing label is set to a destination exchange corresponding to the B-party number, and the telephone call is routed to the appropriate exchange at step 216. If, however the calling party category corresponds to a TCL15 code, indicating that the cellular mobile telephone corresponds to a customer of the cellular controlling facility, then the voice channel of the telephone call is directed to a loop-back exchange terminal 42 (step 210), to delay the routing of the voice channel in the vicinity of the OMSC exchange 30. With the voice channel delayed at the loop-back exchange terminal 42, as described in relation to FIG. 4, the assembled call data for the telephone call is directed to the signalling processor 100 at step 212, by inserting a destination point code in the routing label which corresponds to the signalling processor 100. At step 214, the OMSC exchange 30 awaits receipt of the signalling information from the signalling processor 100, and when the new call information is received from the signalling processor the procedure returns to step 206 to enable assembly of the processed call data, and routing of the telephone call to its destination (step 216).

Figure 6A:
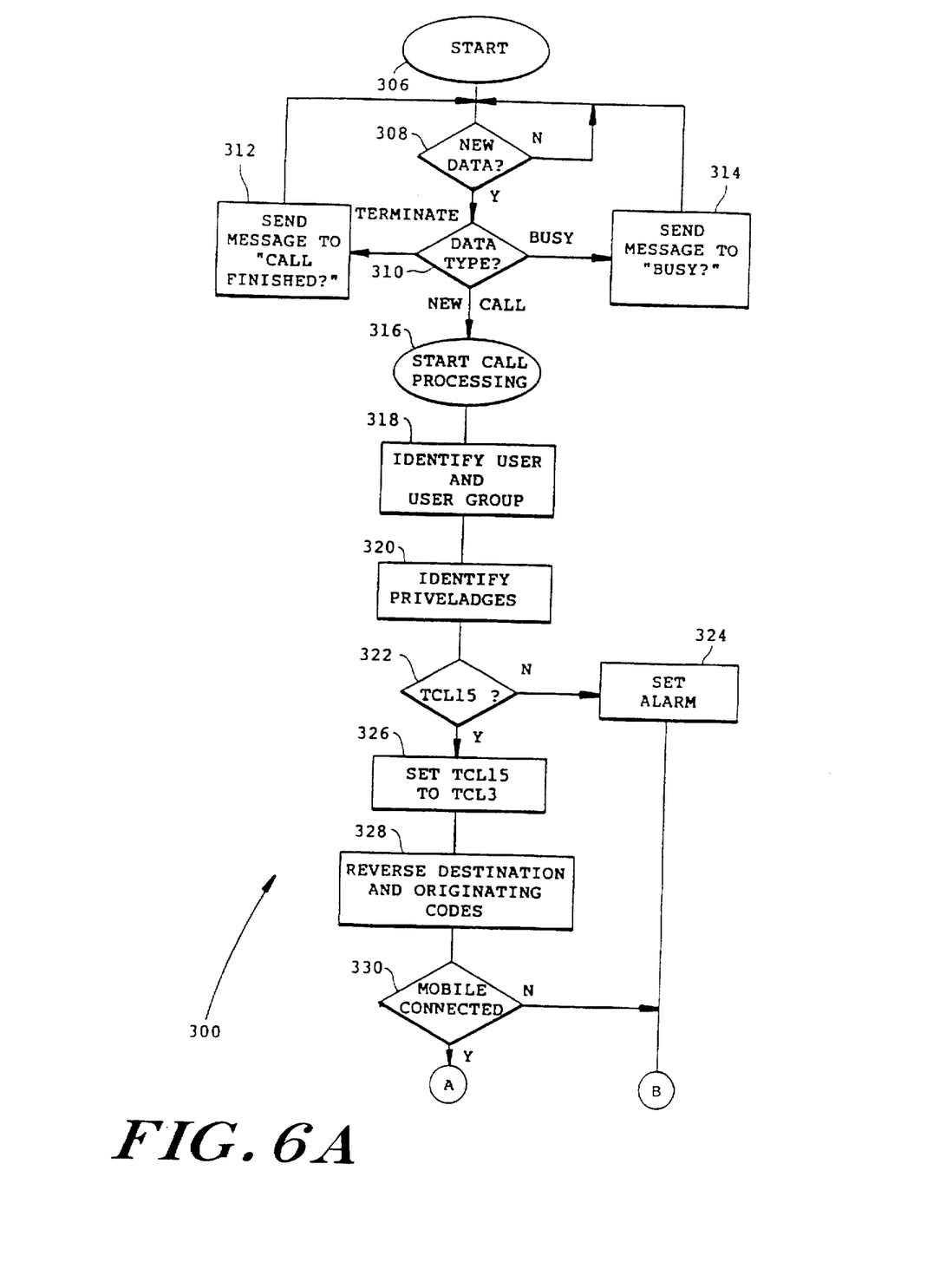
FIGS. 6a, 6b and 6c form a processing flow-chart of events occurring at processing means of the preferred embodiment.
Figure 6B:
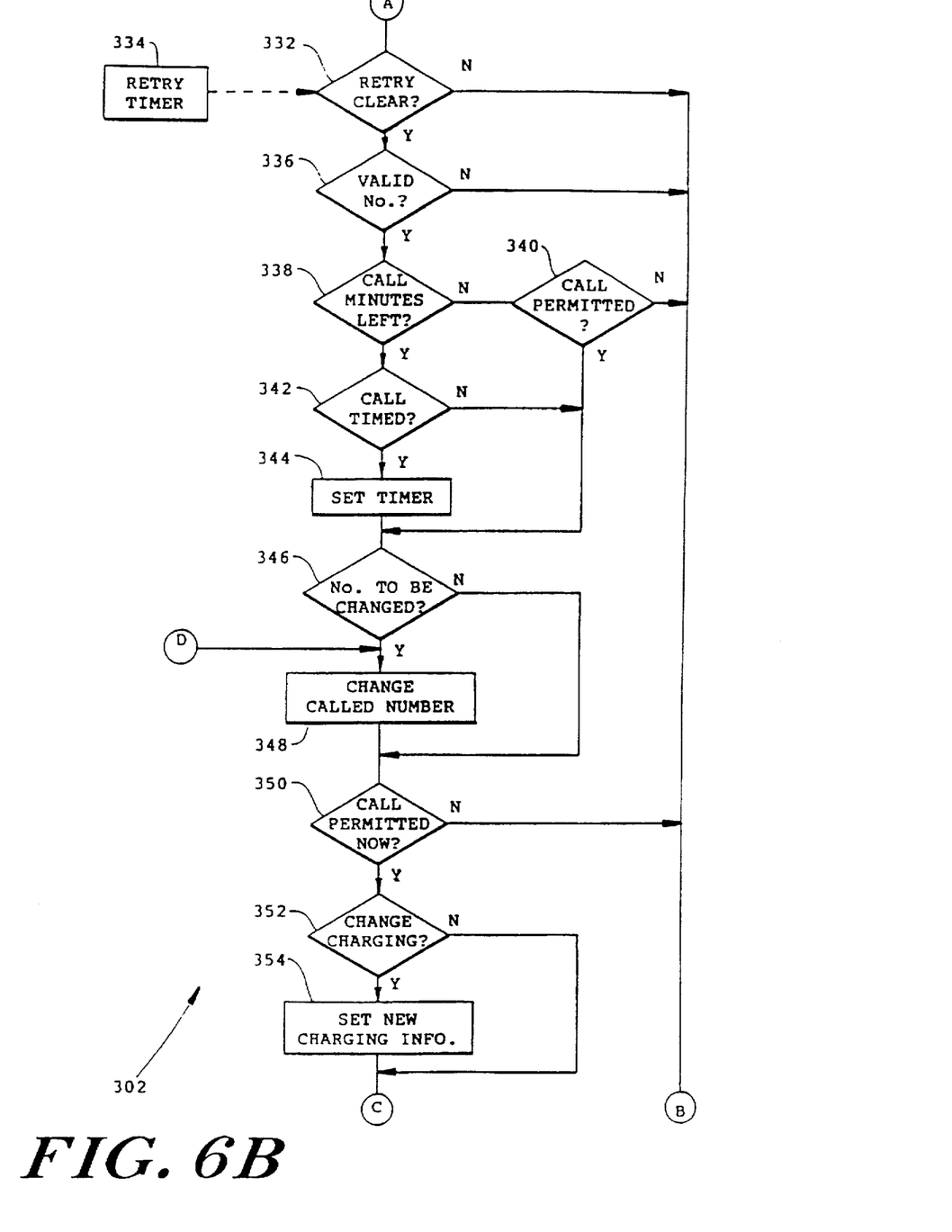
Figure 6C:
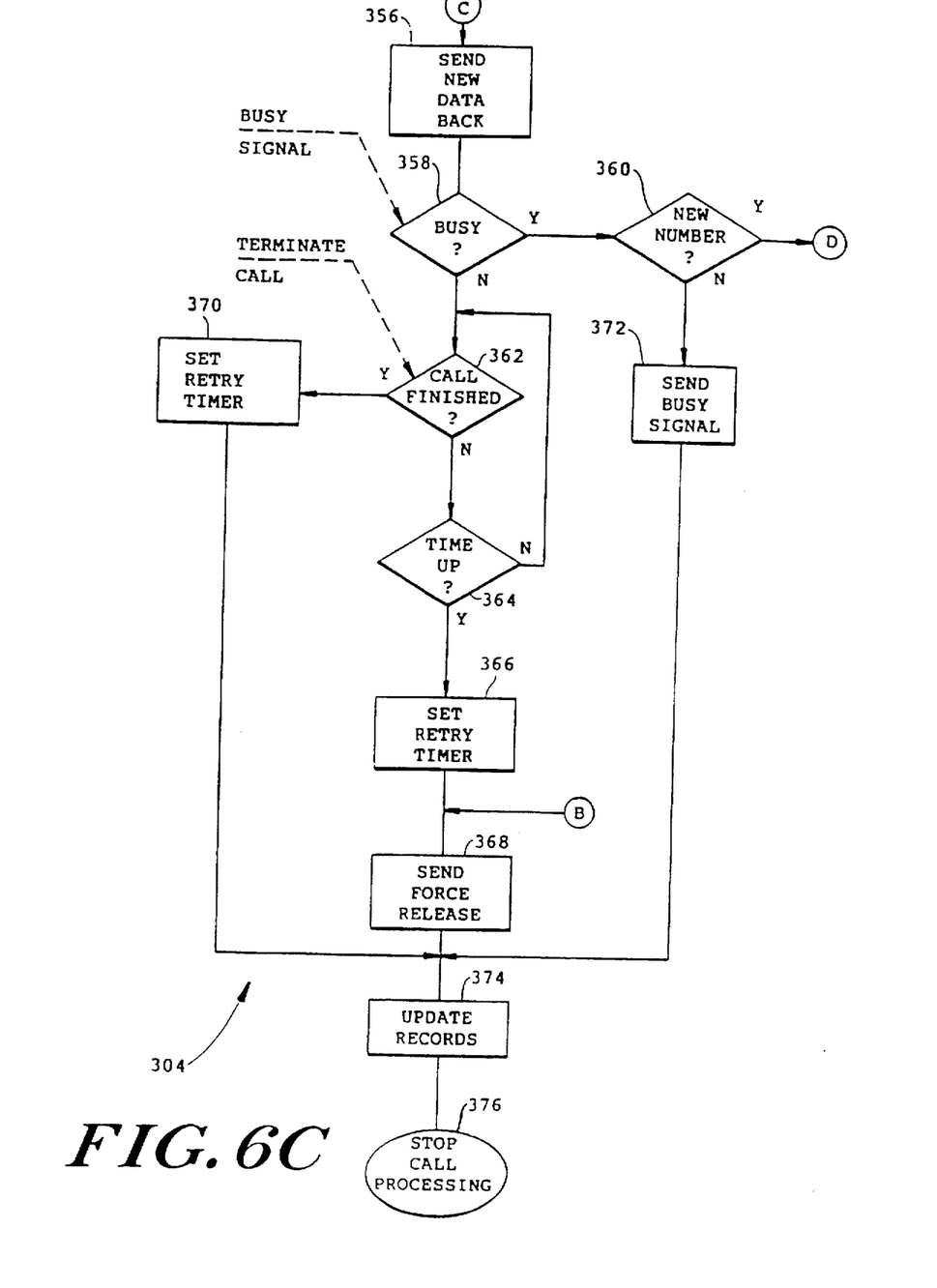

FIGS. 6a to 6c, illustrate flow-chart portions 300, 302 and 304, which collectively form a flow-chart of events which occur at the signalling processor 100, whilst the OMSC exchange waits at step 214.

In the flow-chart portion 300, shown in FIG. 6a, the signalling processor procedure begins at step 306, and at step 308 the signalling processor 100 waits for the receipt of signalling data from the CCS7 network 26 by way of the protocol converter 104. When signalling data is received at step 308, the data is examined at step 310 to determine the type of signalling data which has been received, and the action which must be effected as a result of the received data. Where the signalling data type is determined (step 310) to indicate a busy signal at the B-party telephone number as a result of a previously placed call, the procedure is directed to step 314, where a busy signal is issued to procedural step 368 in flow-chart portion 304, as will be described hereinafter. Similarly, where the signalling data type is determined (step 310) to indicate the termination of a telephone call previously placed, the procedure is directed to step 312, which flags the subsequent procedure portion 304 at step 362. However, when a telephone call is first initiated from a cellular mobile telephone 20 belonging to a subscribing customer of the cellular controlling facility, the new signalling data received at step 308 will be determined to be of the new call variety, and the procedure will proceed to the beginning of call processing at step 316. The initial address message received in the new data at step 308 is passed to procedural step 316 and initially decoded to identify:

The A-party number;

The B-party number;

The originating mobile switching centre exchange (OMSC);

The zone of origin of the OMSC; and

The time of day at the OMSC.

The A-party number determined at step 316, is then utilised at the subsequent step 318 to identify the particular subscribing customer user group to which the cellular mobile telephone characterised by the A-party number belongs, together with the database file of that customer which corresponds to the A-party telephone number and contains the constraints and privileges which have been set for the A-party telephone. Having identified the appropriate database file, the information stored in the file is retrieved at step 320 and the constraints and privileges allocated to the A-party cellular mobile telephone are identified. Subsequent step 322 acts as an error trap to ensure that the A-party cellular telephone in fact belongs to a subscribing customer user group, and this is done by once again examining the calling party category TCL code assigned at the OMSC exchange. If the calling party category code is not a TCL15 code, or the A-party call has been incorrectly designated TCL15 status, then step 324 is executed whereby an alarm within the signalling processor 100 is set which may, among other things, store the call data in an alarm file for examination at a later time by a supervisor. Having set the alarm at step 324, the procedure proceeds to step 368 in flow-chart 304, shown in FIG. 6C, where a force release signal is sent out from the signalling processor 100 to the OMSC exchange 30 by way of the CCS7 network 26. The force release signal is a particular CCS7 message which contains circuit identification codes (CIC's) corresponding to circuits at the exchange which carry the voice channel of the relevant telephone call, and causes the exchange to forcibly release the telephone call circuits to cut off the telephone call.

Having assured that the A-party cellular telephone belongs to a subscribing customer of the cellular controlling facility, and has been correctly allocated a calling party category of TCL15, the calling party category in the initial address message is then set to TCL3, indicating an ordinary cellular mobile telephone (step 326). This step ensures that, when the signalling information is returned to the OMSC exchange, the telephone call is treated as originating from an ordinary cellular telephone such that the telephone call is routed as requested at step 216 of the OMSC exchange event flow-chart 200. If the TCL number was not set to TCL3 before sending the signalling information back to the OMSC exchange 30, the OMSC exchange would recognise the signalling information as belonging to a cellular controller facility customer and would again route the signalling information back to the signalling processor 100.

At step 328, the destination point code and the originating point code, contained in the routing label of the signalling data received from the OMSC exchange 30, are swapped with each other to enable the signalling information, when it is sent back from the signalling processor 100 to the OMSC exchange 30, to reach the appropriate exchange.

One of the options available to the cellular controller customer is the ability to switch off or disable all outgoing calls from a particular cellular telephone, for example during holiday periods as discussed above. If this option has been invoked by the customer, then at step 330 the signalling processor procedure is directed to step 368 to send a force release signal to the OMSC exchange. If the A-party cellular telephone has not been disabled then the procedure continues from step 330 to step 332 of flow-chart portion 302, shown in FIG. 6b. Step 332 controls the retry limiting function of the cellular controller facility, and has an input from a retry timer designated by reference numeral 334. The retry timer 334 is set to a time interval determined by the constraints and privileges contained in the database file of the A-party cellular telephone identified at step 320, and this interval timer is set each time a telephone call made from the A-party cellular telephone is concluded (see step 366 of flow-chart 304). When the interval of the retry timer 334 is finished, the event is registered at step 332, which then allows a subsequent telephone call from the A-party cellular telephone to proceed to step 336. If the retry timer 334 has not yet expired following a preceding A-party telephone call, a force release signal is issued at step 368. At step 336 the B-party telephone number is compared to allowed and disallowed telephone numbers contained in the A-party cellular telephone database file, to determine whether a telephone call to the B-party telephone number is allowed from the A-party cellular telephone. If the B-party telephone number is allowed then step 338 is executed. If, however, the B-party telephone number is one which has been disallowed by the cellular controller facility customer for the A-party cellular telephone then a force release signal is issued at step 368.

As mentioned above, another option afforded the cellular controller customer is to limit the total number of call minutes from the A-party cellular telephone over a period of time, for example per month. If the allowed number of call minutes has already been accrued by the A-party telephone then step 338 directs the signalling processor procedure to step 340 which determines whether the B-party telephone number is a number which is still allowed by the customer without being timed. For example, the cellular controller facility customer may allow telephone calls to be placed to the customer user group administrator even if the predetermined total call minutes have been made from the A-party telephone. If the call is not to a permitted destination then a force release signal is issued at step 368. If the telephone call to the B-party is a permitted call determined at step 340, the signalling processor procedure is directed to step 346.

Once it has been determined that the A-party telephone still has remaining allocated call minutes, the B-party telephone number is again examined (step 342) to determine whether or not the telephone call to the B-party number should in fact be a telephone call which is timed and decremented from the remaining allocated call minutes, or whether the call is to a destination which is not to be timed. If it is determined that the B-party telephone number has been allocated in the A-party database file as one to which telephone calls may be placed without being timed, the procedure is directed to step 346, otherwise a call timer is initiated (step 344) to begin timing of the telephone call.

A further option afforded the cellular controller facility customer is to enable certain telephone calls initiated from the A-party cellular telephone to be redirected, depending on the dialled B-party number. For example, if the customer has PABX extension numbers in a particular range, the customer may stipulate in the signalling processor database that extension numbers dialled from the A-party telephone in that PABX extension range be directed to the PABX telephone number. At step 346 the dialled B-party telephone number is compared to the telephone numbers stored in the signalling processor database file for the A-party cellular telephone, and if the B-party telephone number is one which is allocated to be redirected, the B-party telephone number is changed or modified in accordance with the information contained in the database file (step 348), and the procedure then continues to step 350. If the B-party telephone number is one which is not allocated to be changed in the signalling processor database, then the procedure continues from step 346 directly to step 350.

An option of the cellular controller facility is to allow telephone calls from the A-party cellular telephone to be permitted only during particular times of the day. The allowed calling times stored in the signalling processor database are compared (step 350) with the time at the OMSC exchange at which the present telephone call was initiated, to determine whether the telephone call is to be allowed or disallowed. If the telephone call is allowed at this time, the procedure continues to step 352, otherwise a force release signal is issued at step 368.

Step 352 relates to charging of the telephone call initiated at the A-party cellular telephone. An option of the cellular controlling facility may be that charging of telephone calls made from the controlled cellular telephones be modified under certain circumstances. For example, telephone calls initiated from the A-party cellular telephone may be offered at a discounted rate after a certain number of telephone calls have been made from that cellular telephone for the present month. At step 352 the signal processor determines whether the charging information for the telephone call from the A-party telephone is to be changed, and if not the procedure is directed to step 356. If the call charging for the telephone call is required to be modified, then the procedure continues to step 354 where the charging information is modified in accordance with the data contained in the signalling processor database, and the procedure continues to step 356 of flow-chart 304, shown in FIG. 6c.

Having analysed and modified the initial address message signalling data, received by the signalling processor 100 at step 308, in accordance with the privileges and constraints stored in the signalling processor database, the processed and/or modified signalling data is then reassembled (step 356) into an initial address message CCS7 packet and transmitted through the CCS7 network 26 back to the originating mobile switching centre exchange 30. When the new signalling data is received at the OMSC exchange (step 214 of flow-chart 200), it is associated with the incoming circuits of the loop-back exchange terminals 42, whereupon the exchange 30 acts to direct the voice channel of the telephone call to the appropriate destination exchange, whether it be a mobile service switching centre (MSSC) exchange of the cellular network 24 or an exchange of the public switched telephone network 22.

Once the initial address message signalling data is returned from the signalling processor 100 to the OMSC exchange 30, the voice channel of the telephone call is directed to the appropriate destination exchange, and from there is directed to the B-party telephone. If the B-party telephone is engaged at that time, a busy signal is sent over the CCS7 network 26 via the OMSC exchange 30, to the signalling processor 100, where it is received at step 308 of flow-chart 300, and directed to step 314 where an internal busy signal issues to step 358 of flow-chart 304. If a busy signal is received at step 358, following the execution of step 356, then the procedure is directed to step 360, otherwise the flow-chart continues to step 362.

Another option given the customer of the cellular controller facility is to provide and store numbers in the database to be utilised for redirecting a telephone call when a busy signal is received from a particular dialled B-party number. At step 360 the database file corresponding to the A-party number is examined to see if a redirection telephone number is listed for the busy B-party telephone number, and if so directs the flow-chart operation back to step 348, where the B-party telephone number is altered. If no redirection telephone number is listed in the database file, the flow-chart continues from step 360 to step 372 which transmits the busy signal message over the CCS7 network 26 back to the OMSC exchange 30 to alert the A-party of the busy status of the dialled B-party telephone number. From step 372 the flow-chart continues to step 374 where statistical records listing details of the telephone calls processed by the signalling processor 100 are updated to include the most recent telephone call from the A-party. Following step 374, all processing by the signalling processor 100 is complete and the procedure terminates at step 376.

However, if no busy signal is received at step 358, the telephone call from the A-party to the B-party is assumed to be in progress, and the procedure checks to see if a termination signal has issued (step 362) indicating that either the A-party or the B-party has hung up. As mentioned previously, the termination signal is received at step 308 of flow-chart 300 which is directed to step 312 where termination of the telephone call is flagged for use at step 362. The call timer which was set at step 344 is then examined (step 364) and the processor 100 determines whether the telephone call has reached its time limit based on the time limit set by the subscribing customer and stored in the database file. Steps 362 and 364 are executed consecutively and repeatedly until either a termination signal is received at step 362 or the call timer examined at 364 expires. If the call timer expires (step 364), the procedure continues to step 366 where the retry timer is set for use at step 334, and thence onto step 368 where a force release signal is sent to the OMSC exchange 30. Following execution of step 368, the statistical records of the signalling processor database are updated at step 374, the procedure is terminated at step 376.

If a termination signal is received via the CCS7 network at step 362, prior to the call timer expiring at step 364, then step 370 is executed which acts to set the retry timer for use at step 334, and subsequently the statistical records are updated at step 374 and the procedure terminated at step 376.

The above mentioned sequence of events at the signalling processor 100 account for the processing of only a single telephone call however, in use, when a plurality of telephone calls are required to be processed at the same time by the signalling processor 100 the procedure may be executed concurrently for every telephone call required to be processed, limited only by the processing limitations of the signalling processor itself.

The invention has been described by way of example only. Many variations and modifications may be made without departing from the spirit and scope of the invention as defined in the appended claims.

We claim:

1. A method of controlling telecommunications initiated from a cellular telephone wherein upon initiation of telecommunications said cellular telephone transmits first data which is indicative of a characteristic unique to said cellular telephone, the method comprising:

receiving said first data at one of a plurality of originating cellular telephone switching centres which are part of a cellular mobile telephone system;

determining membership of said cellular telephone to a controlled group on the basis of a prestored relationship between said first data and said controlled group, at least said determining step being executed at said one originating cellular telephone switching centre;

routing signalling data relating to said telecommunications initiated by said cellular telephone from said originating cellular telephone switching centre to a call processor disposed at a location remote from said switching centre;

accessing prestored control data corresponding to said first data when said cellular telephone is determined to be a member of said controlled group, said prestored control data corresponding to respective individual cellular telephones which are members of the controlled group and include prestored indications of allowed and disallowed call characteristics for telecommunications initiated from the cellular telephone; and controlling said telecommunications in accordance with said control data, where said steps of accessing prestored control data and controlling the telecommunications are performed at said call processor.

2. A method according to claim 1 wherein said first data comprises the telephone number of the cellular telephone.

3. A method according to claim 1 or 2 wherein the step of determining membership of said cellular telephone to said controlled group comprises allocating a classification label corresponding to said first data in a stored database and comparing said allocated classification label with a predetermined classification label to determine membership to said controlled group.

4. A method according to claim 1 wherein controlling the telecommunications is achieved by modification of the signalling data by said call processor.

5. A method according to claim 1 or 4 wherein routing of voice data of said telecommunications is delayed at said originating cellular telephone switching centre while the call processor accesses said prestored control data and performs initial modification of said signalling data in accordance with said control data.

6. A method according to claim 1 wherein said prestored control data comprises part of a prestored control database accessible by said call processor.

7. A method according to claim 6 including the step of enabling access to said control database such that a person responsible for a particular cellular telephone is permitted to modify the control data corresponding thereto.

8. A method according to claim 7 wherein said control database is segmented according to groups of cellular telephones such that access to the control database by said person is limited to access to the segment of the control database to which the particular cellular telephone corresponds.

9. A method according to claim 1, or 4 wherein said prestored control data consists of data indicative of allowed and disallowed call characteristics selected from the group consisting of:

the call type, the duration of an individual call, the time elapsed after completion of one call before another call may be initiated, the cumulative duration of calls originating from the radio telephone over a selected time interval, the time of day and days of the week during which calls may be made, and the call destination.

10. A method as claimed in claim 1, including the step of establishing a control database having respective prestored control data representing allowed and disallowed call characteristics for each of a plurality of individual radio telephones.

11. A method as claimed in claim 7, wherein said access to said control database is achieved by way of a computer terminal.

12. Apparatus for use with a telecommunications system including a cellular telephone which, upon a call being initiated from said cellular telephone, transmits first data which is indicative of a characteristic unique to said cellular telephone, and a plurality of originating cellular telephone exchanges which receives said first data transmitted from the cellular telephone, the apparatus comprising means for determining at said originating cellular telephone exchange membership of said cellular telephone to a controlled group on the basis of the received first data and forwarding signalling data to a separate remote call processing means if said cellular telephone is a member of the controlled group, the remote call processing means including:

prestored control data corresponding to respective individual cellular telephones which are members of said controlled group, accessing means for accessing the prestored control data corresponding to said cellular telephone on the basis of the received signalling data, and control means to control at least one characteristic of the call in accordance with said prestored control data.

13. Apparatus according to claim 12 wherein the control means controls said at least one characteristic of the call by modification of signalling data.

14. Apparatus according to claim 13 including means for delaying the routing of a voice channel of the call at said cellular telephone exchange while the call processor accesses the prestored control data and performs initial modification of the signalling data in accordance with said prestored control data.

15. Apparatus according to claim 14 wherein said signalling data is returned to said at least one exchange following said initial modification, the modified signalling data being used at the at least one exchange to control the destination of the voice channel.

16. Apparatus according to claim 14 or 15 wherein the signalling data comprises packet data which is forwarded to the call processing means by allocating the routing label of the packet data with a destination point code corresponding to the call processing means.

17. Apparatus according to claim 12 wherein said control means controls said at least one characteristic of the call by generation of signalling data.

18. Apparatus according to claim 12 including at least one remote access terminal from which said prestored control data is able to be modified.

19. Apparatus as claimed in claim 12, wherein said prestored control data consists of data indicative of allowed and disallowed call characteristics selected from the group consisting of:

the call type, the duration of an individual call, the time elapsed after completion of one call before another call may be initiated, the cumulative duration of calls originating from the radio telephone over a selected time interval, the time of day and days of the week during which calls may be made, and the call destination.

20. A telecommunications system comprising:

a cellular telephone which, upon a call being initiated from the cellular telephone, transmits first data which is indicative of a characteristic unique to said cellular telephone;

a plurality of originating cellular telephone switching centres which are part of a cellular mobile telephone system, each said switching centre including means for receiving said first data transmitted from the cellular telephone, and means for determining at said originating cellular telephone switching centre membership of said cellular telephone to a controlled group on the basis of a prestored relationship between said first data and said controlled group, and generates signalling data for the call; and a call processing means located at a location remote from said cellular telephone switching centre for receiving the signalling data if the cellular telephone is determined to be a member of said controlled group and for controlling allowed and disallowed call characteristics of the call on the basis of prestored control data corresponding to each respective cellular telephone of the controlled group.

21. Apparatus as claimed in claim 20, wherein a single call processing means is provided for said plurality of originating switching centres.

22. A telecommunications system as claimed in claim 20, wherein said prestored control data consists of data indicative of allowed and disallowed call characteristics selected from the group consisting of:

the call type, the duration of an individual call, the time elapsed after completion of one call before another call may be initiated, the cumulative duration of calls originating from the radio telephone over a selected time interval, the time of day and days of the week during which calls may be made, and the call destination.

* * * * *